(12) United States Patent
Laskawy

(10) Patent No.: US 11,661,047 B2
(45) Date of Patent: May 30, 2023

(54) METHOD FOR CONTROLLING A PNEUMATIC BRAKING SYSTEM OF A TRAILER VEHICLE

(71) Applicant: ZF CV Systems Global GmbH, Bern (CH)

(72) Inventor: Ivo Laskawy, Hamburg (DE)

(73) Assignee: ZF CV Systems Global GmbH, Bern (CH)

( * ) Notice: Subject to any disclaimer, the term of this patent is extended or adjusted under 35 U.S.C. 154(b) by 261 days.

(21) Appl. No.: 17/216,728

(22) Filed: Mar. 30, 2021

(65) Prior Publication Data
US 2021/0316705 A1 Oct. 14, 2021

(30) Foreign Application Priority Data

Apr. 8, 2020 (DE) ...................... 10 2020 109 879.0

(51) Int. Cl.
| | |
|---|---|
| *B60T 13/68* | (2006.01) |
| *B60T 7/04* | (2006.01) |
| *B60T 8/17* | (2006.01) |
| *B60T 13/24* | (2006.01) |
| *B60T 15/02* | (2006.01) |
| *B60T 17/22* | (2006.01) |

(52) U.S. Cl.
CPC ............ *B60T 13/683* (2013.01); *B60T 7/042* (2013.01); *B60T 8/17* (2013.01); *B60T 13/24* (2013.01); *B60T 15/027* (2013.01); *B60T 17/221* (2013.01); *B60T 2220/04* (2013.01); *B60T 2270/402* (2013.01); *B60T 2270/404* (2013.01); *B60T 2270/413* (2013.01); *B60T 2270/82* (2013.01); *B60T 2270/88* (2013.01)

(58) Field of Classification Search
CPC ...... B60T 13/683; B60T 15/027; B60T 7/042; B60T 8/17; B60T 13/24; B60T 2270/88;
(Continued)

(56) References Cited

U.S. PATENT DOCUMENTS

| | | | |
|---|---|---|---|
| 9,327,694 B2 * | 5/2016 | Klostermann | ........ B60T 8/1708 |
| 11,440,521 B2 * | 9/2022 | Van Thiel | ............ B60T 15/043 |

(Continued)

FOREIGN PATENT DOCUMENTS

| | | |
|---|---|---|
| DE | 19609222 A1 | 9/1997 |
| DE | 102014002614 A1 | 8/2015 |

(Continued)

OTHER PUBLICATIONS

European Patent No. EP 3822134 published on May 19, 2021 to Nemeth et al.*

(Continued)

*Primary Examiner* — Pamela Rodriguez
(74) *Attorney, Agent, or Firm* — Dickinson Wright PLLC

(57) ABSTRACT

A method includes steps for controlling a pneumatic braking system of a trailer vehicle which is connected to a tow vehicle equipped with a hydraulic or pneumatic braking system. At the start of an actuation of the foot brake valve, an electrical switch is closed or opened, and a switching signal is transmitted to an electronic control unit as a braking start signal for an incipient braking process. A brake value sensor detects a brake value representative of the drivers current deceleration request and transmits the brake value to the electronic control unit as a brake value signal. The brake value sensor is used for determining the incipient braking process, and a backup valve is only deactivated by switching a redundancy valve from an open position to a blocking position if the brake value signal detected by the brake value sensor has reached or exceeded a predefined minimum signal value.

5 Claims, 1 Drawing Sheet

(58) Field of Classification Search
CPC ......... B60T 2270/402; B60T 2270/413; B60T 2220/04; B60T 2270/82; B60T 2270/404; B60T 17/221
See application file for complete search history.

(56) References Cited

U.S. PATENT DOCUMENTS

| | | | |
|---|---|---|---|
| 2019/0263371 A1* | 8/2019 | Goers | B60T 15/027 |
| 2020/0223414 A1* | 7/2020 | Brütt | B60T 7/20 |
| 2021/0001828 A1* | 1/2021 | Van Thiel | B60T 13/662 |

FOREIGN PATENT DOCUMENTS

| | | |
|---|---|---|
| DE | 102014010815 A1 | 1/2016 |
| DE | 202018001859 U1 | 4/2018 |
| DE | 102017009916 A1 | 4/2019 |
| DE | 102018108092 A1 | 10/2019 |

OTHER PUBLICATIONS

WABCO Publication No. 815 020 082 3, "Pneumatic Braking System Agriculture and Forestry—Product Catalogue," Bern, Switzerland, 2017, Edition 11, Version 1, 266 pages, URL: https://www.wabco-customercentre.com/catalog/docs/8150200823.pdf.

* cited by examiner

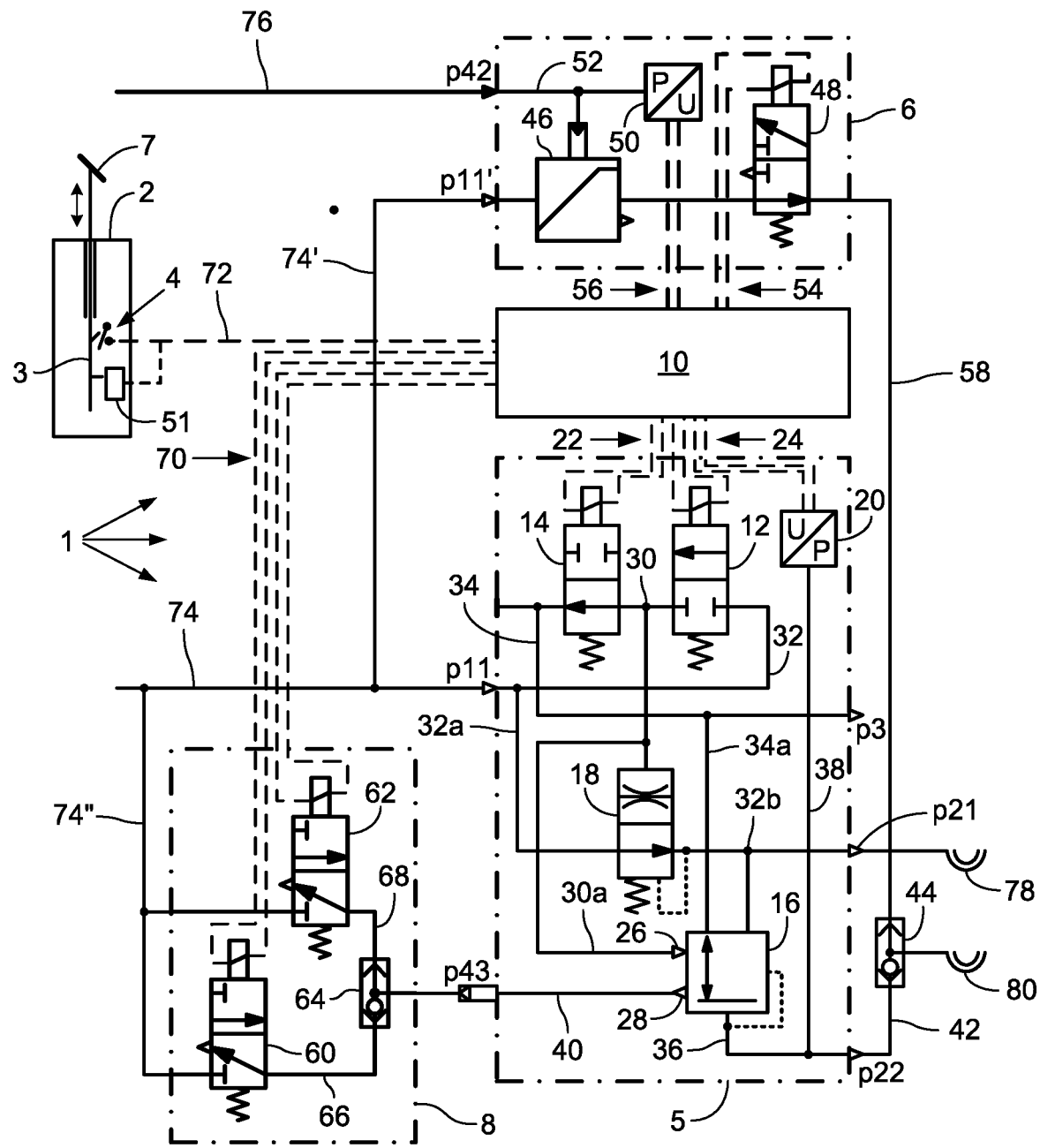

METHOD FOR CONTROLLING A PNEUMATIC BRAKING SYSTEM OF A TRAILER VEHICLE

TECHNICAL FIELD

The present invention concerns a method for controlling a pneumatic braking system of a trailer vehicle which is connected to a tow vehicle equipped with a hydraulic or pneumatic braking system. The braking system of the tow vehicle comprises a foot brake valve with an electrical switch, a trailer control valve with electrically controlled inlet and outlet valves, and with a pneumatically controlled relay valve. Also, the braking system comprises a backup valve with an electrically controlled redundancy valve, a relay valve which can be controlled hydraulically by a braking pressure, and a brake value sensor. Here, according to the method, it is provided that at the start of an actuation of the foot brake valve, the electrical switch is closed from an open position or opened from a closed position, and this switching signal is transmitted to an electronic control unit as a braking start signal for an incipient braking process. Also, via the brake value sensor, a brake value representative of the driver's current deceleration request is detected and transmitted to the electronic control unit as a brake value signal.

BACKGROUND

Modern tow vehicles such as trucks and semitrailers, which are mainly intended for travel on asphalted roads and highways, usually have a compressed air operated braking system with an electronic control unit. In contrast, modern tow vehicles such as tractors, which are configured for use away from asphalted roads and streets, are frequently equipped with hydraulic braking systems with electronic control. The braking systems of both types of vehicle usually have a valve assembly for controlling a pneumatic braking system of a couplable trailer vehicle, comprising a trailer control valve with electrically controlled inlet and outlet valves, a pneumatically controlled relay valve and a backup valve with an electrically controlled redundancy valve and a brake pressure controlled relay valve.

In normal operation, in the trailer control valve, a reservoir pressure produced by a compressor and stored in a compressed air supply system is conducted to a "reservoir" coupling head (red) of the tow vehicle. Also, depending on an electronic brake value signal detected by a brake value sensor, a corresponding brake control pressure is set in the relay valve of the trailer control valve and conducted via a changeover valve to the "brake" coupling head (yellow) of the tow vehicle based on a control pressure set via the inlet and outlet valves.

On failure of the electronic control system or in the absence of the electronic brake value signal, the control input of the assigned relay valve is purged by shut-down of the inlet and outlet valves, and hence the trailer control valve is deactivated. Also, by switching the redundancy valve from a blocking position to an open position, the reservoir pressure input or brake control output of the assigned relay valve is opened and thereby the backup valve activated. Depending on the brake pressure detected at the brake line of the tow vehicle, in the relay valve of the backup valve, a brake control pressure is set for the trailer vehicle and conducted via the changeover valve to the "brake" coupling head (yellow). So the function of the service brakes of the trailer vehicle is guaranteed even on failure of the electronic control system or in the absence of the electronic brake value signal.

Thus for corresponding actuation of the inlet and outlet valves of the trailer control valve and the redundancy valve of the backup valve by means of the electronic control unit, a braking start signal is necessary for an incipient braking process and a brake value signal for the amount of braking deceleration requested by the driver. If the braking start signal is present, by switching of the redundancy valve, the reservoir pressure input or brake control output of the relay valve there is blocked, and thereby the backup valve deactivated. Also then, via the inlet and outlet valves of the trailer control valve, a control pressure is set which leads to the setting of a brake control pressure in the relay valve there, corresponding to the brake value signal. With a coupled trailer vehicle, this brake control pressure is conducted via a brake control line of the tow vehicle, via the "brake" coupling head (yellow) and a brake control line of the trailer vehicle, to the trailer brake valve arranged in the trailer vehicle where the brake control pressure is converted into a corresponding brake pressure for the wheel brake cylinders of the trailer vehicle.

In tow vehicles which are intended primarily for travel on asphalted roads and highways and are equipped with a compressed air operated braking system, the electrical switch and the electronic brake value sensor are usually arranged in or on a foot brake valve in which a rod is mounted so as to be axially displaceable by a brake pedal against the return force of a spring. At least one actuating element, such as e.g. a pressure plate, a rod or a permanent magnet, is fixedly connected to or in active connection with the rod and actuates or controls the switch and/or brake value sensor.

Such a foot brake valve with an electrical switch and an electronic brake value sensor is known for example from DE 10 2014 010 815 A1. The electrical switch is there configured as an electromechanical switch which, on actuation of the brake pedal, after a short idle travel of a plunger, is closed thereby via a pressure plate and a pivot lever. This publication also states that the electrical switch may alternatively be configured as a contactless and hence wear-free active proximity switch. Whether such a switch is brought into its closed position or open position on actuation of the brake pedal is not decisive, as is well known. It is important only that a switching signal is produced. The electronic brake value sensor is configured as a travel sensor, the function principle of which is based on a change in an electrical resistance, an inductance or a capacitance, or on counting of pulses. The signal emitter of the travel sensor is a body which is connected by form fit to the pressure plate and guided in a side chamber of the foot brake valve so as to be displaceable parallel to the plunger.

In tow vehicles which are mainly intended for travel off asphalted roads and equipped with a hydraulic braking system, usually only an electrical switch is arranged in or on a foot brake valve. The electronic brake value sensor however is configured as a hydraulic pressure sensor which is connected to a brake line of the tow vehicle. The pressure sensor may be arranged separately in the tow vehicle or inside the backup valve.

Such a braking system of a hydraulically braked tow vehicle, with an electrical switch and an electronic brake value sensor configured as a hydraulic pressure sensor, is depicted and described in several embodiments in DE 10 2014 002 614 A1. In the valve assemblies of this known brake system, the redundancy valve is configured as a 2/2-way magnetic switching valve which is arranged in the backup valve at the brake control output of the relay valve. In the non-energized state, the redundancy valve is open so that the brake control pressure, which is input into the relay valve depending on a brake pressure taken from a hydraulic brake line of the tow vehicle, reaches the "brake" coupling head (yellow) via a changeover valve. In the energized state, the redundancy valve is closed, whereby the brake control pressure input into the relay valve no longer reaches the "brake" coupling head (yellow), so the backup valve is deactivated. In these embodiments of the braking system, the hydraulic pressure sensor, which is active as an electronic brake value sensor and supplies the electronic brake value signal for the electronically controlled trailer control valve, is arranged outside the backup valve.

In a vehicle train with a hydraulically or pneumatically braked tow vehicle and a pneumatically braked trailer vehicle of the type described above, it may occur that the trailer vehicle is not braked during a braking process. This happens if, on an actuation of the brake pedal, the electrical switch at the foot brake valve is indeed switched but because of a defect, the brake value sensor does not transmit a brake value signal in the form of an adjustment travel or brake pressure to the electronic control unit. In this case, apart from a low precontrol pressure, no brake control pressure is output for the trailer vehicle in the trailer control valve because the brake value signal from the brake value sensor has a value of zero. At the same time however, because of the closed electrical switch, the backup valve is deactivated so that also in the relay valve there, no redundant brake control pressure is output or from this reaches the "brake" coupling head (yellow).

SUMMARY

The present invention is therefore based on the object of indicating a method for controlling a pneumatic braking system of a trailer vehicle of the type cited initially with which an unbraked state of the trailer vehicle on failure of the brake value sensor can be prevented as far as possible without additional equipment being required.

Accordingly, the invention concerns a method for controlling a pneumatic braking system of a trailer vehicle which is connected to a tow vehicle equipped with a hydraulic or pneumatic braking system, wherein the braking system of the tow vehicle comprises a foot brake valve with an electrical switch; a trailer control valve with electrically controlled inlet and outlet valves and with a pneumatically controlled relay valve; and a backup valve with an electrically controlled redundancy valve, a relay valve which can be controlled hydraulically by a braking pressure, and a brake value sensor.

According to the method, it is provided that at the start of an actuation of the foot brake valve, the electrical switch is closed from an open position or opened from a closed position, and this switching signal is transmitted to an electronic control unit as a braking start signal for an incipient braking process, and by means of the brake value sensor, a brake value representative of the driver's current deceleration request is detected and transmitted to the electronic control unit as a brake value signal.

To achieve the object above, it is provided that the brake value sensor is used for determining an incipient braking process, and the backup valve is only deactivated by a switching of the redundancy valve from an open position to a blocking position if the brake value signal detected by means of the brake value sensor has reached or exceeded a predefined minimum signal value.

Because, according to the method described above, the backup valve is only deactivated by a switching of the redundancy valve from an open position to a blocking position if the brake value signal detected by the brake value sensor has reached or exceeded a predefined minimum signal value, the above-mentioned problem of an unbraked trailer vehicle is eliminated in a simple fashion without additional equipment being required.

If the driver actuates the foot brake valve via the brake pedal in order to initiate a braking process, then depending on the brake pressure in the brake line of the tow vehicle, a brake control pressure is output via the relay valve of the backup valve and conducted to the "brake" coupling head (yellow) as long as the brake value signal detected via the brake value sensor reaches or exceeds the predefined minimum signal value.

If however the brake value sensor is faulty or no brake value signal is transmitted to the electronic control unit for other reasons, no brake control pressure is output in the assigned relay valve because the inlet and outlet valves of the trailer control valve are not actuated. Since, however, the redundancy valve has not been switched to its blocking position, the backup valve remains activated so that a brake control pressure is output in the assigned relay valve and conducted to the "brake" coupling head (yellow). This ensures that the trailer vehicle is braked in a braking process even in the case of failure of the brake value sensor or absence of a brake value signal for another reason.

The brake value sensor may also be used in addition to the electrical switch for determining an incipient braking process. In this case, the backup valve is deactivated only if the electrical switch is closed and the brake value signal detected by means of the brake value sensor has reached or exceeded the predefined minimum signal value. As well as a fault in the brake value sensor or the absence of a brake value signal, a faulty electrical switch in or on the foot brake valve or the absence of a switching signal of the switch also leads to the backup valve being deactivated by the switching of the redundancy valve from an open position to a blocking position, and the trailer control valve being activated by the actuation of the inlet and outlet valves.

However, the brake value sensor may also be used instead of the electrical switch for determining an incipient braking process. The electrical switch in or on the foot brake valve may then be omitted or its available switching signal not used. In this case, the backup valve is deactivated only if the brake value signal detected by the brake value sensor has reached or exceeded the predefined minimum signal value.

If the brake value sensor is configured as a travel sensor which is arranged in or on the foot brake valve and in active connection with an axially displaceable rod, the minimum signal value preferably corresponds to the idle travel of the rod or an adjustment travel of the rod exceeding the idle travel by maximum 20%. The adjustment travel of a brake pedal is usually transmitted to the rod of the foot brake valve with a translation ratio in the range between 6:1 and 7:1. In the case of a total travel value of the rod of for example 9 mm detected by the travel sensor, the idle travel is typically 0.75 mm and the adjustment travel used by the rod is 7 mm. Accordingly, in this case the minimum signal value may be established at a value between 0.75 mm and 0.9 mm (0.75 mm×1.2=0.9 mm).

If the brake value sensor is configured as a pressure sensor which is connected to a brake line of a tow vehicle, the minimum signal value preferably corresponds to the response pressure of the wheel brakes of the tow vehicle or a braking pressure exceeding the response pressure of the wheel brakes by maximum 20%. In the case of pneumatic braking systems, the response pressure of the wheel brakes lies at a value of $0.2 \times 10^5$ Pa to $0.25 \times 10^5$ Pa. Accordingly, in this case the minimum signal value may be established as a value between $0.2 \times 10^5$ Pa and $0.3 \times 10^5$ Pa ($0.25 \times 10^5$ Pa$\times 1.2 = 0.3 \times 10^5$ Pa). For high-pressure hydraulic braking systems, the response pressure of the wheel brakes however is $3 \times 10^5$ Pa to $3.5 \times 10^5$ Pa. Accordingly, the minimum signal value in this case may be set to a value between $3 \times 10^5$ Pa and $4.2 \times 10^5$ Pa ($3 \times 10^5$ Pa$\times 1.2 = 4.2 \times 10^5$ Pa).

To clarify the invention further, a drawing with an exemplary embodiment is appended to the description.

BRIEF DESCRIPTION OF THE DRAWING

The only FIGURE shows a known valve assembly of a hydraulic braking system of a tow vehicle for controlling a pneumatic braking system of the trailer vehicle coupled to the tow vehicle.

DETAILED DESCRIPTION OF THE DRAWING

The method according to the invention for controlling a pneumatic braking system of a trailer vehicle is explained below as an example with reference to a valve assembly 1 (shown in the FIGURE) of a hydraulic braking system of a tow vehicle, as is known from page 105 of the WABCO publication 815 020 082 3 "Compressed air braking systems, agriculture and forestry/Product catalog".

This valve assembly 1 comprises an electronically controlled trailer control valve 5, a hydraulically controlled backup valve 6, an electronically controlled parking brake module 8, and an electronic control unit 10. The parking brake module 8 could also be provided structurally separately from the valve assembly 1, and its parking brake modules 60, 62 could also be actuated by another control device.

The trailer control valve 5 has a pneumatically controllable relay valve 16, a pneumatically controllable rapid response valve 18, an inlet valve 12, an outlet valve 14 and a pneumatic pressure sensor 20. The inlet valve 12 and outlet valve 14 are each configured as a 2/2-way magnetic switching valve, in particular a proportional valve, by means of which the pneumatic control pressure present at a control input 26 of the pneumatic relay valve 16 can be adjusted. The switching magnets of the inlet valve 12 and outlet valve 14 are connected via electrical control lines 22, and the pressure sensor 20 is connected via electrical sensor lines 24, to the electronic control unit 10.

The inlet valve 12 is closed in the non-energized state (as shown) and open in the energized state. The outlet valve 14 is open in the non-energized state (as shown) and closed in the energized state. A control pressure line 30 which leads from the output of the inlet valve 12 and from the input of the outlet valve 14 to a control input of the rapid response valve 18, and leads via a line branch 30a connected to this control pressure line 30 to the direct first control input 26 of the pneumatic relay valve 16, can be connected via the inlet valve 12 to an internal reservoir pressure line 32 and via the outlet valve 14 to a purge line 34 leading to a purge output p3. The reservoir pressure line 43 is connected to a pneumatic reservoir pressure input p11 of the trailer control valve 5.

In the fitted state of the trailer control valve 5, an external pneumatic reservoir pressure line 74 from a pneumatic compressed air supply system of the tow vehicle is connected to the reservoir pressure input p11, and when the drive engine of the tow vehicle is running, carries a reservoir pressure amounting to around $8.5 \times 10^5$ Pa. A line portion 32a branching off the pneumatic reservoir pressure line 32 is conducted via the rapid response valve 18 and an output-side line portion 32b to a reservoir pressure output p21 of the trailer control valve 5. A "reservoir" coupling head (red) 78 is connected to this reservoir pressure output p21.

A reservoir pressure input of the pneumatic relay valve 16 is connected to the pneumatic reservoir pressure line 32 via the branching line portion 32a and the output-side line portion 32b. A purge output of the pneumatic relay valve 16 is connected via a connecting line 34a to the purge line 34 leading to the purge output p3. A brake control output of the pneumatic relay valve 16 is conducted via an output-side brake control line 36 to a brake control output p22 of the trailer control valve 5. An external brake control line 42 connected to the brake control output p22 is conducted to a first input of the first changeover valve 44, the output of which is connected to a "brake" coupling head (yellow) 80. The pressure sensor 20 is connected via a sensor pressure line 38 to the output-side brake control line 36. A further control pressure line 40 is arranged between an inverted control input p43 of the trailer control valve 5 and an inverted second control input 28 of the pneumatic relay valve 16.

The backup valve 6 has a relay valve 46 which can be controlled hydraulically by a brake pressure, an electronically controllable redundancy valve 48, and a hydraulic pressure sensor 50. A control input of the hydraulically controllable relay valve 46 is connected via an internal control pressure line 52 to a hydraulic control pressure input p42 of the backup valve 6. In fitted state of the backup valve 6, the hydraulic control pressure input p42 is connected via a connecting line 76 to a brake line of a hydraulic brake circuit of the tow vehicle. The pressure sensor 50 is also connected to the internal control pressure line 52.

A pneumatic reservoir control input of the hydraulically controllable relay valve 46 is connected to a reservoir pressure input p11' of the backup valve 6. In fitted state of the backup valve 6, the reservoir pressure input p11' of the backup valve 6 is connected via a pneumatic connecting line 74' to the external pneumatic reservoir pressure line 74. A brake control output of the hydraulically controllable relay valve 46 can be connected to a second input of the first changeover valve 44 via the redundancy valve 48 and an external brake control line 58.

When the reservoir pressure input p11' of the backup valve 6 is carrying pressure, depending on the hydraulic brake pressure present at the brake pressure input p42, a pneumatic brake control pressure is produced in the hydraulically controllable relay valve 46, output and conducted to the first changeover valve 44 via the external brake control line 58 when the redundancy valve 48 is open. The first changeover valve 44 conducts the respective higher brake control pressure from the brake control line 42 of the trailer control valve 5 or from the brake control line 58 of the backup valve 6 on to the "brake" coupling head 80.

The redundancy valve 48 is configured as a 3/2-way magnetic switching valve, the output of which is connected via the external brake control line 58 to the second input of the first changeover valve 44. In non-energized state, the redundancy valve 48 is in the open position shown, in which the external brake control line 58 is connected to the brake control output of the hydraulically controllable relay valve 46. In the energized state, the redundancy valve 48 is switched from the open position shown to a blocking position in which the brake control output of the hydraulically controllable relay valve 46 is blocked, and the external brake control line 58 is connected to a purge output of the redundancy valve 48 and is therefore pressureless. The switching magnet of the redundancy valve 48 is connected via electric control lines 54, and the pressure sensor 50 is connected via electric control lines 56, to the electronic control unit 10.

The parking brake module 8 serves to actuate the trailer control valve 5 at the inverted control pressure input p43 in order to operate the wheel brakes of a coupled trailer vehicle in a parking brake auxiliary brake function. The parking brake module 8 comprises two parallel-connected parking brake valves 60, 62 and a second changeover valve 64 downstream thereof on the output side. In the fitted state of the parking brake module 8, the output of the second changeover valve 64 is connected to the inverted control pressure input p43 of the trailer control valve 5. The two parking brake valves 60, 62 are configured as 3/2-way magnetic switching valves, the switching magnets of which are connected, in the fitted state of the parking brake module 8, to the electronic control unit 10 via electrical control lines 70 in this exemplary embodiment.

The electronic control unit 10 is also connected via a data bus 72, which may normally be a CAN bus, to further electronic control units, sensors and switches of the tow vehicle and a coupled trailer vehicle. These also include (as shown) a switch 4 which is arranged on or in a foot brake valve 2 and can establish at least an initial actuation of a brake pedal 7. Also, the electronic control unit 10 may be connected for measuring purposes to the travel sensor 51 shown in the FIGURE, which is also arranged on or in the foot brake valve 2 and serves to measure an adjustment travel covered by a rod 3 of the foot brake valve 2.

Via the two parking brake valves 60, 62, a brake control line 66, 68 (connected to a respective input of the second changeover valve 64) may be connected alternately to a branch of a line portion 74″ branching off the external pneumatic reservoir pressure line 74 or to a purge output. The second changeover valve 64 conducts the respective higher brake control pressure from the brake control line 66 of the first parking brake valve 60, or from the brake control line 68 of the second parking brake valve 62, via the inverted brake control pressure input p43 of the trailer control valve 5 and the internal brake control line 40 there, on to the inverted control input 28 of the pneumatic relay valve 16.

In non-energized state of the parking brake valves 60, 62, the brake control lines 66, 68 there—and hence also the inverted control input 28 of the pneumatic relay valve 16—are switched to be pressureless. In this way, a maximum brake control pressure is output from the pneumatic relay valve 16 of the trailer control valve 5, and conducted via the internal brake control line 36, the brake control output p22, the external brake control line 42 and the first changeover valve 44, to the "brake" coupling head (yellow) 80. In this way, with a coupled trailer vehicle, its wheel brake cylinders are loaded with a maximum brake pressure via the trailer brake valves there, whereby the wheel brakes there are applied by means of the parking brake or auxiliary brake function.

After actuation, i.e. switching of one of the two parking brake valves 60, 62, the respective brake control line 66, 68—and hence the inverted control input 28 of the pneumatic relay valve 16—is loaded with the reservoir pressure from the line portion 74″ of the external pneumatic reservoir pressure line 74. In this way, with a coupled trailer vehicle, its wheel brake cylinders are purged via the trailer brake valve there, whereby the wheel brakes there are released by means of the parking brake or auxiliary brake function.

In normal driving operation of the tow vehicle, the two parking brake valves 60, 62 are energized and hence switched so that the wheel brakes of a coupled trailer vehicle are then released by means of the parking brake or auxiliary brake function. For redundancy reasons, the electronic control unit 10 has separate switch units for independent switch actuation of the two parking brake valves 60, 62, which units are configured such that the respective switching state of the parking brake valves 60, 62 is maintained automatically and can only be changed actively.

In normal operation of the valve assembly 1, the trailer control valve 5 is activated and the backup valve 6 deactivated. Also, the parking brake module 8 is deactivated as long as there is no request signal in the electronic control unit 10 for releasing the wheel brakes of the trailer vehicle by means of the parking brake or auxiliary brake function.

Until now, the trailer control valve 5 has been activated and the backup valve 6 deactivated via a switching signal from the electric switch 4, which is arranged in or on the foot brake valve 2 of the tow vehicle and is closed after overcoming a short idle travel of the rod 3 that is axially displaceable by means of the brake pedal 7. In the presence of a corresponding switching signal from switch 4, which indicates an incipient braking process, the backup valve 6 is switched to its blocking position by the switching of the redundancy valve 48 and thereby deactivated.

Then in the trailer control valve 5, depending on a present electronic brake value signal, a control pressure leading to the direct control input 26 of the pneumatic relay valve 16 is output via a corresponding actuation of the inlet and outlet valves 12, 14. This control pressure is converted in the pneumatic relay valve 16 into a corresponding brake control pressure, which is conducted to the "brake" coupling head (yellow) via the internal brake control line 36, the brake control output p22, the external brake control line 42 and the changeover valve 44.

The brake value signal may be detected by means of the travel sensor 51 arranged in or on the foot brake valve 2. Alternatively, the brake value signal may however be detected by means of a pressure sensor connected to a brake line of the tow vehicle. In the present case, the function of the brake value sensor is fulfilled for example by the pressure sensor 50, which is arranged in the backup valve 6 and connected to a hydraulic brake line of the tow vehicle via the internal control pressure line 52 and the external connecting line 76.

If the electrical switch 4 is closed on actuation of the brake pedal 7, i.e. the corresponding switch signal for an incipient braking process is transmitted to the electronic control unit 10 via the CAN bus 72, but because of a defect the pressure sensor 50 does not transmit to the electronic control unit 10 a brake value signal in the form of a brake pressure value greater than zero, the backup valve 6 is deactivated by the switching of the redundancy valve 48 into its blocking position. Since, however, the brake value signal produced by the pressure sensor 50 and transmitted to the control unit has the value of zero, or a brake pressure in the brake line of the tow vehicle has a value of zero Pascal or approximately zero Pascal, the pneumatic relay valve 16 of the trailer control valve 5 does not output a brake control pressure which exceeds a predefined precontrol pressure. Consequently, the trailer vehicle is again not braked. Such a precontrol pressure ineffective for braking may amount for example to $0.6 \times 10^5$ Pa to $1.0 \times 10^5$ Pa.

This defect of an unbraked trailer vehicle is avoided by the control method according to the invention, in that the pressure sensor 50 acting as a brake value sensor is used in addition or as an alternative to the electrical switch 4 of the foot brake valve 2 for determining an incipient braking process.

For this, it is provided that the backup valve 6 is only deactivated by a switching of the redundancy valve 48 from the open position to the blocking position if the brake value signal produced by means of the brake value sensor 50 has reached or exceeded a predefined minimum signal value. In the present case of use of the pressure sensor 50, connected to a hydraulic brake line of the tow vehicle, as a brake value sensor, the minimum signal value preferably corresponds to the response pressure of the wheel brakes of the tow vehicle or a brake pressure exceeding the response pressure of the wheel brakes by maximum 20%. For hydraulic high-pressure braking systems, the response pressure of the wheel brakes is approximately $3 \times 10^5$ Pa to $3.5 \times 10^5$ Pa. Accordingly, the minimum brake pressure used as a minimum signal value may in this case be established at a value between $3 \times 10^5$ Pa and $4.2 \times 10^5$ Pa.

If the pressure sensor 50 is used in addition to the electrical switch 4 of the foot brake valve 2 for determining an incipient braking process, the backup valve 6 is deactivated by a switching of the redundancy valve 48 only if the electrical switch 4 is closed and the brake pressure measured by means of the pressure sensor 50 has reached or exceeded the predefined minimum brake pressure.

It may however also be provided that, if the pressure sensor 50 may be used in addition to the electrical switch 4 of the foot brake valve 2 for determining an incipient braking process, the backup valve 6 is deactivated by a switching of the redundancy valve 48 only if the brake pressure measured by means of the pressure sensor 50 has reached or exceeded the predefined minimum brake pressure. In this case, a switching of the electrical switch 4 is accordingly not an essential condition for deactivation of the backup valve 6.

If the pressure sensor 50 is used instead of the electrical switch 4 for determining an incipient braking process, the backup valve 6 is deactivated by a switching of the redundancy valve 48 only if the brake pressure measured by means of the pressure sensor 50 has reached or exceeded the predefined minimum brake pressure.

In the case of a defect of the pressure sensor 50 or in the absence of a brake value signal for another reason, it is thus ensured, in a simple fashion and without additional equipment being required, that the backup valve 6 remains activated. So in this case, a brake control pressure is set in the hydraulically controllable relay valve 46 of the backup valve 6, output and conducted to the "brake" coupling head (yellow) 80 so that the trailer vehicle is braked accordingly.

LIST OF REFERENCE CHARACTERS

1 Valve assembly
2 Foot brake valve
3 Rod of foot brake valve
4 Electrical switch on foot brake valve
5 Trailer control valve
6 Backup valve
7 Brake pedal
8 Parking brake module
10 Electronic control unit
12 Inlet valve, 2/2-way magnetic valve
14 Outlet valve, 2/2-way magnetic valve
16 Pneumatically controllable relay valve
18 Rapid response valve
20 Pneumatic pressure sensor
22 Control lines
24 Sensor lines
26 Direct control input at pneumatic relay valve
28 Inverted control input at pneumatic relay valve
30 Control pressure line
30a Line branch
32 Reservoir pressure line
32a First line portion
32b Second line portion
34 Purge line
34a Connecting line
36 Brake control line
38 Sensor pressure line
40 Control pressure line
42 Brake control line
44 First changeover valve
46 Hydraulically controllable relay valve
48 Redundancy valve
50 Hydraulic pressure sensor, brake value sensor (first alternative)
51 Travel sensor, brake value sensor (second alternative)
52 Control pressure line
54 Control lines
56 Sensor lines
58 Brake control line
60 First parking brake valve
62 Second parking brake valve
64 Second changeover valve
66 First brake control line
68 Second brake control line
70 Control lines
72 Data bus, CAN bus
74 Pneumatic reservoir pressure line, brake control line
74' Pneumatic connecting line
74" Pneumatic line portion
76 Hydraulic connecting line to brake line of tow vehicle
78 "Reservoir" coupling head (red)
80 "Brake" coupling head (yellow)
p3 Purge output
p11 Reservoir pressure input at trailer control valve
p11' Reservoir pressure input at backup valve
p21 Reservoir pressure output at trailer control valve
p22 Brake control output at trailer control valve
p42 Hydraulic control pressure input at backup valve, brake pressure input
p43 Control pressure input at trailer control valve

The invention claimed is:

1. A method for controlling a pneumatic braking system of a trailer vehicle which is connected to a tow vehicle equipped with a hydraulic or pneumatic braking system having a foot brake valve (2) with an electrical switch (4); a trailer control valve (5) with electrically controlled inlet and outlet valves (12, 14) and with a pneumatically controlled relay valve (16); and a backup valve (6) with an electrically controlled redundancy valve (48), a relay valve (46) which can be controlled hydraulically by a braking pressure, and a brake value sensor (50, 51); the method comprising the following steps:

upon initiation of an actuation of the foot brake valve (2), determining an incipient braking process by the brake value sensor, generating a switching signal by closing the electrical switch (4) from an open position or by opening the electrical switch from a closed position, transmitting the switching signal to an electronic control unit (10) as a braking start signal for the incipient braking process, detecting, via the brake value sensor, a brake value representative of a driver's current deceleration request;

transmitting the brake value to the electronic control unit (10) as a brake value signal, and only upon determining that the brake value signal detected by the brake value sensor (50, 51) has reached or exceeded a predefined minimum signal value, deactivating the backup valve (6) by switching the redundancy valve (48) from an open position to a blocking position.

2. The method as claimed in claim 1, wherein the brake value sensor (50, 51) is used in addition to the electrical switch (4) for determining the incipient braking process, and the backup valve (6) is deactivated only when the electrical switch (4) is closed and the brake value signal detected by the brake value sensor (50, 51) has reached or exceeded the predefined minimum signal value.

3. The method as claimed in claim 1, wherein the brake value sensor (50, 51) is used instead of the electrical switch (4) for determining the incipient braking process, and the backup valve (6) is deactivated only when the brake value signal produced by the brake value sensor (50, 51) has reached or exceeded the predefined minimum signal value.

4. The method as claimed in claim 1, wherein, when the brake value sensor is configured as a travel sensor (51) arranged in or on the foot brake valve (2) and actively connected with an axially displaceable rod (3) thereof, wherein the predefined minimum signal value corresponds to an idle travel of the rod (3) or an adjustment travel of the rod exceeding the idle travel by at most 20%.

5. The method as claimed in claim 1, wherein, the brake value sensor is configured as a pressure sensor (50) connected to a brake line of a tow vehicle equipped with a hydraulic or pneumatic braking system and the predetermined minimum signal value corresponds to a response pressure of wheel brakes of the tow vehicle or to a braking pressure exceeding the response pressure of the wheel brakes by at most 20%.

* * * * *